United States Patent [19]
Pohl

[11] 3,873,447
[45] Mar. 25, 1975

[54] COLD TRAP FOR LIQUID SODIUM IMPURITIES COLLECTION

[75] Inventor: Lawrence E. Pohl, Los Gatos, Calif.

[73] Assignee: The United States as represented by the United States Atomic Energy Commission, Washington, D.C.

[22] Filed: Dec. 21, 1973

[21] Appl. No.: 427,392

[52] U.S. Cl................. 210/179, 210/187, 210/265, 266/37
[51] Int. Cl............................................. B01d 35/06
[58] Field of Search ....... 62/55.5; 210/85, 181, 182, 210/187, 256, 183, 184, 185, 179; 75/66; 266/22, 37

[56] References Cited
UNITED STATES PATENTS

| | | | |
|---|---|---|---|
| 2,745,552 | 5/1956 | Bruggeman et al................. | 210/181 |
| 2,978,344 | 4/1961 | Parker et al.................... | 210/187 X |
| 3,162,510 | 12/1964 | Meissner et al................. | 210/187 X |
| 3,511,378 | 5/1970 | Goregliad........................ | 210/181 |
| 3,554,374 | 1/1971 | Blair et al...................... | 210/85 |
| 3,618,770 | 11/1971 | Pohl et al....................... | 210/85 |
| 3,693,959 | 9/1972 | Swinhoe et al.................. | 210/85 X |

*Primary Examiner*—Samih N. Zaharna
*Assistant Examiner*—Robert H. Spitzer
*Attorney, Agent, or Firm*—John A. Horan; F. A. Robertson; L. E. Carnahan

[57] ABSTRACT

A device for removing and storing impurities found in high temperature sodium or other liquid metal loops of nuclear reactors. Utilization of the crystallizer zone is increased by organizing and directing the incoming flow in such a way that the impurities accumulate progressively from the bottom toward the top. This is accomplished by segregating the flow into several controllable sections.

7 Claims, 2 Drawing Figures

COLD TRAP FOR LIQUID SODIUM IMPURITIES COLLECTION

BACKGROUND OF THE INVENTION

The invention described herein was made in the course of, or under, Contract No. AT(04-3)-189, Project Agreement No. 57, with the U.S. Atomic Energy Commission.

This invention relatets to cold traps for use in liquid metal circuits, and more particularly to an improved cold trap for liquid sodium impurities collection.

During operation of liquid-sodium-loop systems of nuclear reactors, the liquid sodium is subject to the formation of impurities in the form of oxides, hydrides, metallic compounds, and metallic and carbon particles by the reaction of the sodium with water from leads in the secondary system steam generator, or by reaction of sodium and its steel containment, or by reaction of sodium with oil from failure of lubricated bearing seals, or by reaction of sodium with cover gas contaminents. Much effort has been directed to the development of cold traps as exemplified by U.S. Pat. Nos. 2,745,552 issued May 15, 1956; 3,554,374 issued Jan. 12, 1971; 3,618,770 issued Nov. 9, 1971 and 3,693,959 issued Sept. 26, 1972. While these prior cold traps have been effective to a certain extent, plugging will occur when the impurities buildup, filling the trap body to the entrance of the mesh filled filtration zone or flow return tube. Since usually less than 25 percent of the total volume of the trap constitutes storage volume thereof, and since tests have shown that the impurities constitute from 20 to 50 percent of the total buildup, the trap is thus expended and must be discarded when only a minor fraction of its volume is utilized for trapping impurities. Thus, a need exists for a more effective cold trap.

SUMMARY OF THE INVENTION

The present invention provides a solution to above need by a cold trap which increases the utilization of the cooler-crystallizer tank (i.e., the cold trap body) upwards of two-thirds the volume thereof. Such higher utilization of the crystallizer is effected by organizing and directing the flow in the crystallizer in such a way that the natural and forced convection processes cause intensive supply of impurities to the crystallization-accumulation zone. In this invention, this is accomplished by a staging process; that is, segregating the incoming flow path into several controllable (valved) sections. When a stage of the crystallizer zone has been efficiently utilized so that the impurities have formed up to the levels of the inlet tube, for example, and begin to block flow or lower cleanup efficiency, then another section is valved in, thereby directing the saturated stream into the next stage. This can be done manually, but could also be accomplished automatically either by means of a preloaded check valve approach or by use of a motor driven valve responding to a pre-set $\Delta P$ across the cold trap. By additional flow circuits to an optimum number, the utilization of cooler-crystallizer volume for collection and retention of impurities can be significantly increased. The sodium flow control valves are external to the cold trap where their operational reliability is high and is not compromised by the deleterious effects of a high impurity environment.

Therefore, it is an object of this invention to provide an improved cold trap for liquid sodium impurities collection.

A further object of the invention is to provide a cold trap which more effectively utilizes the volume thereof for trapping impurities.

Another object of the invention is to provide a cold trap which utilizes directed, sectionalized flow therein whereby the natural and forced convection processes cause intensive supply of impurities within the crystallization-accumulation zone therein.

Another object of the invention is to provide a cold trap which utilizes controlled, sectionized flow therein to produce a staging-type accumulation process for impurity collection and storage.

Other objects of the invention will become readily apparent from the following description and accompanying drawings.

DESCRIPTION OF THE INVENTION

Figure 1:
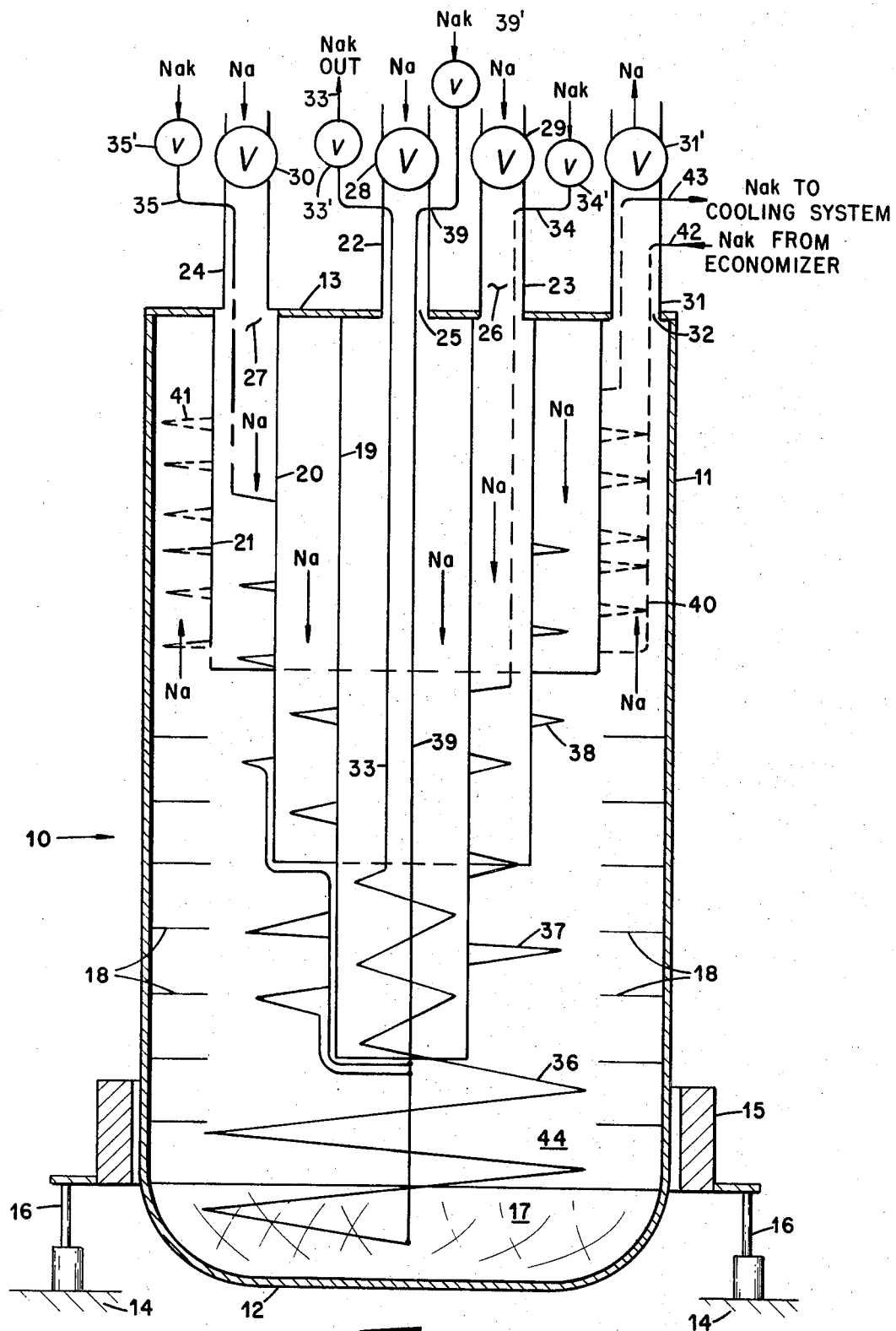
FIG. 1 schematically illustrates an embodiment of a cold trap made in accordance with the invention, and FIG. 2 schematically illustrates the FIG. 1 embodiment positioned in a coolant and monitoring system.

Functional cold traps are essential to sodium cooled reactors and associated plant operation to maintain low sodium impurity levels for defense against materials degradation, mass transfer and system plugging; and to minimize confusion of sensitive monitoring instruments. Cold trap availability is necessary not only to bring the system purity to high levels initially and maintain it there for long periods, but to cope with transient, high inputs of impurities from accidents. Without cold trap capability, plant availability will inevitably become too low to be economical and will be shutdown for this reason, if not for reasons of safety. With the forthcoming development of the Liquid Metal Fast Breeder Reactor (LMFBR) Demonstration Plant, Plant, deficiencies of the prior known cold traps are overcome by the present invention which meets the varied requirements of the primary and secondary systems thereof, as briefly described below, with high reliability.

In the Demo Plant primary system, the cold trap must remove and retain the impurity inputs (consisting of oxygen, hydrogen and carbon compounds of sodium) from the reactor circuits as well as from the fuel storage vessel. It is expected that this burden will be a sustained one during normal reactor operation, due to the regular cleanup of new fuel surfaces and exposure of the fuel storage vessel pool to reactor component atmosphere contaminants. Periods of high input would be expected during and following reactor "head-off" for refueling due to contamination from reactor component atmosphere and maintenance activities. Occasional high levels of contamination could also result from accidents (such as lubricant in-leakage from damaged bearing seals). Thus, the trap must be able to accommodate a fairly wide range of incoming sodium impurity levels without premature plugging. Because of the radioactivity of elements collected in it, efficient utilization of the trap volume is highly desirable in order to minimize its size and the attendant cost of the cold trap shielded vault and removal transfer cask, as well as reduce building, equipment and maintenance costs.

The Demo Plant secondary system cold trap must be capable of extracting the water in-leakage reaction products from very small steam generator leaks as well as remove the reaction products from a secondary coolant loop which has been shutdown because of a large leak. The design of the secondary cold trap, therefore, must be capable of accommodating short term, high level (600°F saturation) reaction products input as well as maintaining the traditional high purity level function (<300°F saturation). This corresponds to a range of 100:1 impurity level for sodium oxide alone — one of the several reaction products. Therefore, this trap, too, must be able to handle wide range impurity inputs without premature plugging.

The primary advantages provided by the present invention are: (1) prevention of premature plugging; (2) increasing capacity for storage and retention of precipitated impurities; (3) increasing clean-up effectiveness; and (4) improving control of trap operation.

In addition the present invention overcomes the four main problem areas of the prior known cold traps as outlined hereinafter:

1. Early reduction of cold trap life (loss of clean-up capability) caused by premature plugging in the locations of the economizer outlet, inlet to crystallizer, inlet to filtration zone, and outlet of filtration zone. The consequence of premature plugging is cessation of the cold trap flow, leaving the reactor coolant system defenseless against deleterious impurity inputs (e.g., oxygen, hydrogen, or carbon inputs from possible contamination during refueling, from steam generator leaks, from oil lubricated bearing seal failure, etc.).

2. Inefficient utilization of the crystallizer volume by plugging of some part of the trap circuit within the crystallizer can prematurely terminate the planned usefulness of the cold trap. In prior designs this can occur when the impurities buildup fills the crystallizer tank to the entrance of the mesh-filled filtration zone or flow return tube. Since the impurity storage volume is usually less than 25 percent of the total volume of the trap, and since, numerous examinations of deposits in prior cold traps have shown that impurities constitute less than 50 percent of the total — more frequently this figure is only about 20 percent — the trap must be discarded when only a minor fraction of its volume is utilized for trapping impurities.

3. Low clean effectiveness since impurity precipitation is diffusion rate limited due to laminar conditions resulting from low flow in the crystallizer, and/or flow through the trap being restricted by "5 minute residence" requirements and heat transfer (e.g., heat dissipation) limitations, and/or density differences caused by short circuiting of the deposition zone before effective crystallization removal of the impurities can take place.

4. Restricted cleanup capability limited because of residence time requirements and heat transfer limitations such that in an emergency the system throughputs cannot be increased significantly without dumpint previously trapped impurities or raising trap temperature. This limits the speed with which an operator can reduce the cold trap temperature required to prevent deleterious effects from occurring (e.g., plugging of portions of the flow circuit, confusion of sensitive online monitors such as leak detectors, etc.).

The inventive cold trap, an embodiment being described hereinafter with respect to FIG. 1, includes the following principal features:

1. Of the forced convection type.
2. Comprised of a single zone cooler-crystallizer where substantially all of the temperature drop of the incoming sodium occurs at the planned deposition region.
3. Employs NaK cooling with regeneration to sodium via NaK-to-sodium heat exchanger and heat rejection via NaK-to-air cooler.
4. Utilizes directed, sectionalized flow within the cooler-crystallizer, and directed, sectionalized cooling within the same zones, to increase utilization of the crystallizer.
5. Equipped for forced turbulence in the crystallizer to increase efficiency, improve heat transfer and promote better impurity deposition and higher utilization of the crystallizer.

Referring now to the embodiment of the invention illustrated in FIG. 1, comprises a container or housing defining a cooler-crystallizer assembly generally indicated at 10 and having vertically extending wall section 11, a closed bottom section 12, and an apertured upper section or cover 13. An electromagetnic stirrer assembly generally indicated at 15 of the type, for example, described in the above-mentioned U.S. Pat. No. 3,618,770 is positioned about the lower portion of wall section 11 and supported via stirrer positioners 16 mounted on support structure 14. The closed bottom section 12 of assembly 10 contains packing or mesh 17 of stainless steel or other suitable material. A plurality of radially extending turbulence restrictor vanes, fins or baffles 18 are attached ot the lower approximately one-half of the inner surface of wall section 11. Cooler-crystallizer assembly 10 contains a plurality of open-ended cylinder-like members 19, 20, 21 of different diameters and length coaxially positioned with respect to each other and secured to the apertured upper section 13. Cylinder-like members 19–21 divide the interior of assembly 10 into various sections whereby directed, sectionalized flow and cooling within the same zones can be accomplished. Inlet conduits 22, 23 and 24, for material to be purified, such as sodium (Na), are connected via apertures 25, 26 and 27 with the interior of cylinder-like members 19, 20 and 21, with valve assemblies 28, 29 and 30 being mounted in the respective conduits. An outlet conduit 31, having a valve 31' therein, for the purified material, such as sodium, is connected via aperture 32 with the interior of assembly 10 external of cylinder-like member 21. Sodium-potassium (NaK) temperature control outlet conduits or pipes 33, 34 and 35 having valves 33', 34', and 35' therein extend into respective conduits 22, 23 and 24 and form cooling circuits 36, 37 and 38, respectively, the coolant entering via a common inlet conduit 39 which extends outwardly through conduit 22. Note that cooling circuits 36–38 extend at least partially into respective cylinder-like members 19, 20 and 21. A reheater, generally indicated at 40 comprises a helically configured circuit 41 which exttends about cylinder-like member 21, having an inlet 42 connected to an economizer (see FIG. 2) and an outlet 43 connected to an external cooling system. Thus, as the cooled purified sodium passes upwardly between cylinder-like member 21 and the internal surface of wall section 12, it is in heat exchange relation with reheater circuit 41 and is heated thereby.

Prevention of premature plugging is accomplished by the above-described embodiment of the invention by insuring that the temperature of the incoming stream of impurity laden sodium does not go below the impurity saturation-temperature until the stream reaches the crystallizer zone (i.e., the planned impurity storage zone). Since deposition of impurity begins practically at the place where the impurity concentration in the sodium reaches the saturation point, the temperature gradients in the inlet part of the trap must be minimal. This is accomplished by the FIG. 1 embodiment wherein: (1) all cooling of inlet sodium is in a single zone cooler-crystallizer, (2) the cooling is profiled within the crystallizer so that the maximum gradient occurs at the desired deposition site, (3) the flow is directed into the desired deposition zone, (4) more uniform and effective cooling in the deposition zone is achieved by the Na to NaK heat exchange arrangement, and (5) packing materials in regions where impurity deposition on the packing would cause restriction of flow is eliminated.

Higher utilization of the cooler-crystallizer is, as pointed out above, effected by organizing and directing the flow in the crystallizer in such a way that the natural and forced convection processes cause intensive supply of impurities to the crystallization-accumulation zone. This is accomplished by a staging process; that is, segregating the incoming flow path into several controllable (valved) sections, as described hereinbelow. Thus, when a stage or section of the crystallizer zone has been efficiently utilized so that the impurities have formed up to the levels of the inlet area and begin to block flow or lower cleanup efficiency, then the next stage or section is valved in, thereby directing the saturated stream into the next stage, and so forth until the crystallization-accumulation volume is effectively utilized. This can be done manually, but may also be accomplished automatically either by means of a preloaded check valve approach or by use of a motor driven valve responding to a pre-set $\Delta P$ across the cold trap. Thus, by adding flow circuits to an optimum number, it can significantly increase the utilization of the cooler-crystallizer volume for collection and retention of impurities.

The operation of the FIG. 1 embodiment, to accomplish the above-described sectionalized cooling and stagging process is as follows: Impurity laden sodium is directed as indicated by the flow arrows via inlet conduit 22, valve 28, and cylinder-like member 19 into a crystallization-accumulation zone 44 within cooler-crystallizer 10, the NaK coolant being directed through circuit 36 via inlet conduit 39, valve 39' and outlet conduit 33 and valve 33' such that the temperature of the Na is reduced whereby the impurities therein is deposited on the packing 17, the lower vanes 18 and the lower portion of the wall section 12, the purified sodium passing via reheater 40 through valved outlet conduit 31. When the crystallizer zone 44 has been filled with deposit to a level below the end of cylinder-like member 19 and begin to block flow, then the sodium is directed via conduit 23, cylinder-like member 20 into the zone 44 and coolant is directed through NaK circuit 37, whereby the saturated stream of impurity laden sodium is directed into another stage or area of zone 44 whereby additional deposition of the impurities can take place without flow restriction of the sodium. Upon deposit buildup to a level below the end of cylinder-like member 20, the incoming impure sodium is valved through conduit 24 and cylinder-like member 21 with the NaK being directed through circuit 38, whereby continued deposit of the impurities in the zone 44 can be accomplished thereby utilizing a greater volume of the assembly 10.

For effective operation of a cold trap the necessary supply of impurity to the crystallization zone and a high coefficient of mass exchange in this zone must be ensured. Molecular and thermal diffusion cannot produce the necessary rate of purification, owing to their low transport coefficients. Only convective transfer of impurities to their crystallization sites can ensure the necessary rate of purification in the trap. It has been shown that an increase in fluid turbulence near deposition sites greatly enhances the precipitation of dissolved materials. The reason for this deposition enhancement is due to the increase in the mass transfer coefficient as the fluid turbulence (Reynolds number) is increased. This, in turn, increases the transfer of the impurities across the liquid boundary layer at the nucleation sites, thus enhancing impurity removal.

This is accomplished in the FIG. 1 embodiment by electromagnetically stirring the saturated sodium in the planned deposition region of the crystallizer-accumulator zone 44. It has been shown that a tow-fold increase in cold trap effectiveness for impurity removal was achieved by producing high turbulence in the crystallizer of a cold trap.

Besides increasing the mass transfer coefficient and thereby maximizing the removal of impurities, stirring produces the following additional benefits.

1. It organizes the impurity deposition buildup on sites designed to accumulate and retain it (e.g., finned or vaned surfaces, packing, container walls, etc.).

2. It improves the utilization of the deposition zone (increases impurity concentration) by preventing deposition layering which occurs in stagnant crystallizers.

3. It improves the heat transfer of the cooling circuit (NaK heat exchanger) by mixing the fluid (prevents thermal stagnation).

4. It minimizes density differences in the crystallizer and reduces the tendency of the incoming saturated sodium stream "to short circuit" the planned deposition zone.

The electromagnetic stirring is accomplished by a polyphase stator of the assembly indicated generally at 15 in FIG. 1, and is identical to a large helical induction pump stator. Removal of the cold trap, as required, would be possible without interferences from the stator.

Integrating the cooling zone with the crystallizer such that substantially the entire cooling occurs at the planned deposition region for each stage insures that the temperature of the incoming sodium cannot go below the impurities saturation value. In addition, the planned increase in cooling capabilities for the disclossed cold trap (by virtue of more effective NaK cooling, surplus of cooling system, and responsive temperature control system) allows for accommodating sudden increases in impurity inputs. This means that the plant operator can quickly adjust to the need for higher cold trap capability, either by means of increased throughput or by tolerating a higer inlet impurity saturation level at normal flow, or both, without the consequences of cold trap plugging or of dumping previously trapped impurities. In this respect, the inventive cold trap becomes a much less touchy device to operate and is less prone to maloperation.

Figure 2:
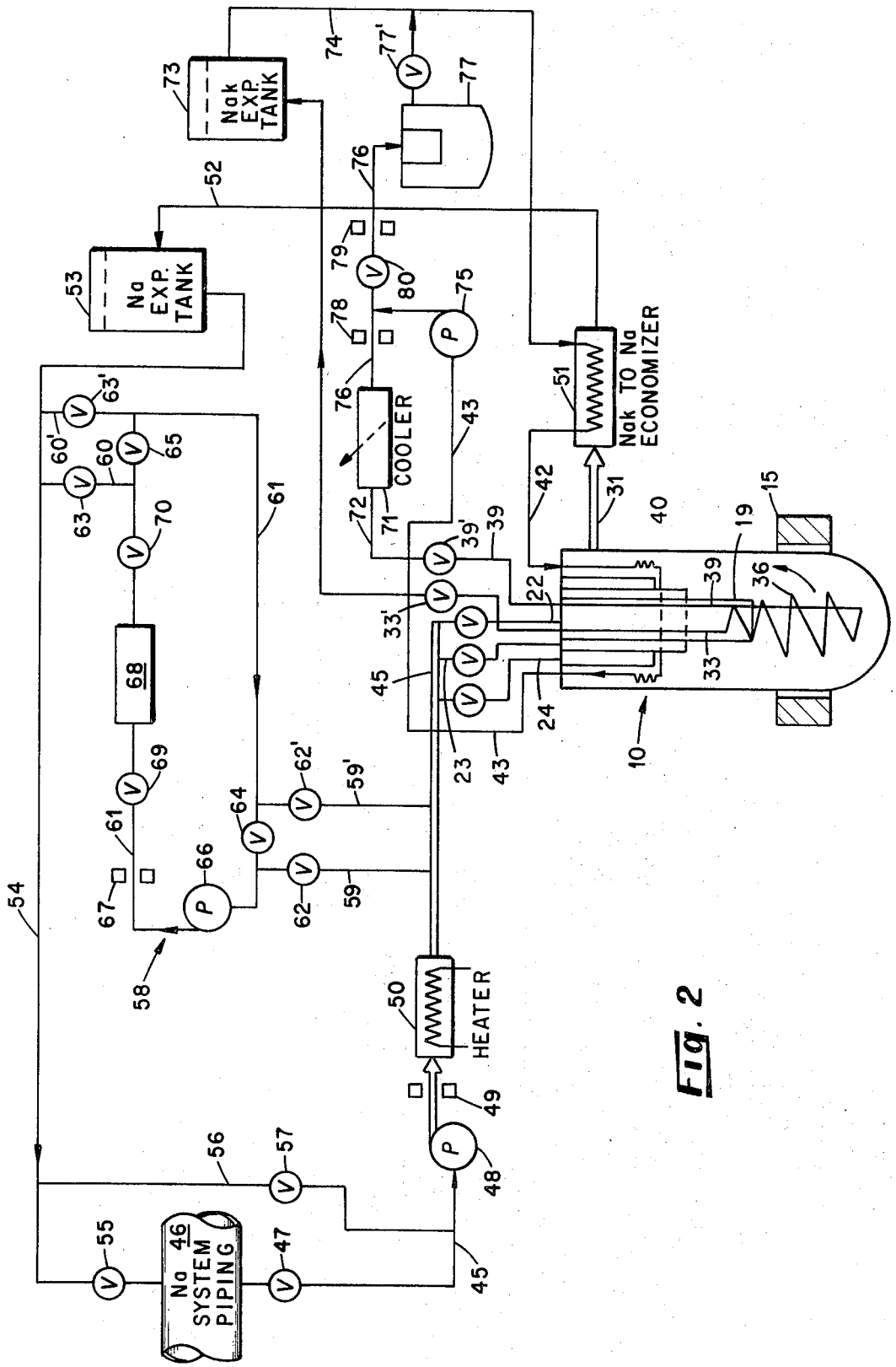

Referring now to FIG. 2, the cold trap of FIG. 1 is illustrated in a system for controlling the sectionalized flow and cooling within the crystallizer-cooler 10, with like components being given similar reference numerals. Note that FIG. 2 only shows one of the three NaK cooling circuits in assembly 10, namely circuit 36, for clarity. Inlet conduits 22, 23 and 24 are each connected to a common conduit or pipe 45 which is connected to a main sodium system pipe 46 via a valve assembly 47, an electromagnetic pump 48, a flow meter 49 and a heater 50. Purified sodium is passed from outlet duct or conduit 31 via a NaK-to-Na economizer 51 and conduit 52 into sodium expansion tank 53 and from tank 53 via conduit 54, having a valve assembly 55 therein, into the main system piping 46. The purified sodium is reheated, partly in the exit region of the crystallizer 10 by reheater 40 to insure sub-saturation conditions of the exiting sodium, to prevent outlet line plugging, and partly in the conventional tube-in-shell heat exchanger or economizer 51. This reduces the size of the heat rejector (economizer or air cooler) while minimizing system power losses.

To provide for cold trap recirculation and thus isolation from the main system 46 while being maintained in standby condition a conduit of line 56 interconnects outlet conduit 54 with inlet conduit 45, conduit 56 being provided with a control valve assembly 57. This allows the cold trap to be kept in a state of readiness with the sodium flowing continuously therethrough by opening of valve assembly 57, closing valve assemblies 47 and 55 and circulating the sodium via pump 48 while maintaining the desired temperature by heater 50. This arrangement makes the cold trap in readiness for immediate reconnection to the main system 46 if an emergency requires, or in order to evaluate the effects of impurity additions on cold trap performance without producing harmful levels in the main system. The sodium expansion tank 53 can be eliminated or bypasses during actual operation of the system, but is described and utilized herein as an impurity addition station for simulation of impurity inputs to determine the effects on cold trap performance.

An impurity monitoring station (IMS) generally indicated at 58 is connected intermediate inlet conduit 45 and outlet conduit 54 by two pairs of respective tubes or lines 59-59' and 60-60' connected respectively to conduits 45 and 54, and to a common fluid circuit of the IMS 58 indicated at 61, each tube being provided with a control valve 62-62' and 63-63', respectively, control valves 64 and 65 being mounted in circuit 61 intermediate lines 59-59' and 60-60', respectively. Circuit 61 includes a pump 66, a flow meter 67, and impurity detectors, such a diffusion type hydrogen detector 68, having valves 69 and 70 located on each side of detector 60. Thus, sodium from either conduit 45 or 54 may be withdrawn and monitored in the IMS 58 to evaluate the cold trap performance, and then returned to the desired sodium conduit by appropriate manipulation of the valves 62-62', 63-63', 64, 65, 69 and 70. Because of the continuous operation of the IMS 58, it is possible to alarm and perform simple control functions automatically.

The NaK cooling system comprises a cooler 71 discharging into a common conduit 72 which is connected to inlet conduits 39 of FIG. 1, and provided with control valve 39'. As described above, the NaK from conduits 33–35 discharges from crystallizer-cooler assembly 10 terminating in a NaK expansion tank 73. The expansion tank 73 is connected by conduit or line 74 to economizer 51 and discharges therefrom into the inlet 42 of reheater 40 and discharges therefrom via outlet 43 within which is positioned a pump 75, the output which is directed into a conduit 76 which is connected at one end to cooler 71 and at the opposite end to a conventional cold trap 77, trap 77 being connected to conduit 74 via valve 77'. A pair of flow meters 78 and 79 are mounted in conduit 76 on opposite sides of the discharge of pump 75, with a valve 80 being mounted intermediate meter 79 and the pump discharge connect with conduit 76 such that the output from pump 75 may be controllably directed into cooler 71 or into cold trap 77, or both.

It has thus been shown that the present invention provides an improved cold trap for liquid metal coolant impurity collection by organizing and directing the incoming flow in such a way that the impurities accumulate progressively from the bottom toward the top, this being accomplished by segregating the flow into several controllable (valved) sections.

While a particular embodiment of the invention has been illustrated and described, modifications will become apparent to those skilled in the art, and it is intended to cover in the appended claims all such modifications as come within the spirit and scope of the invention.

What I claim is:

1. An apparatus for removing and collecting impurities in liquid metal coolant which precipitate out under prescribed temperature conditions and cause plugging of components in an associated system comprising: container means defining a cooler-crystallizer, a plurality of a coaxial cylinder-like members positioned within said container means, each of said cylinder-like members being secured in radial spaced relationship at one end thereof to said container means and being open at the opposite end, each of said cylinder-like members being of a different length and cross-section than an adjacent cylinder-like member, means for selectively directing impurity containing liquid metal into each of said cylinder-like members, outlet means operatively connected to said container means for discharging purified liquid metal therefrom, each of said cylinder-like members being provided with a selectively controlled cooling circuit for cooling liquid metal passing therethrough, and means positioned intermediate said cylinder-like members and said container means for reheating liquid metal flowing toward said outlet means, whereby impurities are precipitated out of liquid metal flowing therethrough and collected within said container means.

2. The apparatus defined in claim 1, additionally including a plurality of spaced turbulence restrictor vanes positioned along at least a lower interior wall surface of said container means.

3. The apparatus defined in claim 1, additionally including means for causing a stirring action of liquid metal within at least a lower portion of said container means.

4. The apparatus defined in claim 1, additionally including packing-like material in a portion of said container means.

5. The apparatus defined in claim 1, wherein said container means comprises a vertically positioned housing having a closed lower end and a plurality of openings in the upper end, said plurality of coaxial cylinder-like members being secured to said upper end of said housing and each being in open communication with an associated one of said plurality of openings in said upper end, one of said cylinder-like members being of longest length and smallest cross-section and being centrally positioned within said housing, each subsequent radially outward positioned cylinder-like member being shorter in length than an adjacent preceding cylinder-like member, and radially spaced therefrom said means for selectively directing impurity containing liquid metal into each of said cylinder-like members including a plurality of inlet conduits connected at one end to said openings in said upper end of said housing and adapted to be connected at the outer end thereof to a common liquid metal source, each of said inlet conduit means being provided with a valve assembly for selectively controlling flow of liquid metal therethrough.

6. The apparatus defined in claim 5, wherein said cooling circuits for each of said cylinder-like means includes an inlet extending through an associated inlet conduit into an upper portion of said cylinder-like means and is configured in a spiral configuration in the lower portion of said cylinder-like member and downwardly externally of said cylinder-like member, each of said cooling circuits having an outlet connected to a common outlet conduit.

7. The apparatus defined in claim 1, wherein said liquid metal coolant directed through said container means is composed essentially of liquid sodium, and wherein said cooling circuits and said reheating means contains sodium-potassium as the circulating medium therein.

* * * * *